US012594691B2

(12) United States Patent
Godelmann

(10) Patent No.: US 12,594,691 B2
(45) Date of Patent: Apr. 7, 2026

(54) METHOD OF AND DEVICE FOR PRODUCING CONCRETE BLOCKS

(71) Applicant: Godelmann GmbH & Co. KG, Fensterbach (DE)

(72) Inventor: Bernhard Godelmann, Kümmersbruck (DE)

(73) Assignee: GODELMANN GMBH & CO. KG, Fensterbach (DE)

( * ) Notice: Subject to any disclaimer, the term of this patent is extended or adjusted under 35 U.S.C. 154(b) by 270 days.

(21) Appl. No.: 18/187,243

(22) Filed: Mar. 21, 2023

(65) Prior Publication Data

US 2023/0321867 A1 Oct. 12, 2023

(51) Int. Cl.
*B28B 13/02* (2006.01)

(52) U.S. Cl.
CPC ........ *B28B 13/022* (2013.01); *B28B 13/0245* (2013.01); *B28B 13/029* (2013.01)

(58) Field of Classification Search
CPC . B28B 13/022; B28B 13/0245; B28B 13/029; B28B 3/02; B28B 13/026; B28B 13/0295; B28B 1/16; B28B 7/24; B28B 13/02; B28B 17/0063; E01C 5/065; E01C 11/225
See application file for complete search history.

(56) References Cited

U.S. PATENT DOCUMENTS 3,792,635 A * 2/1974 Goransson .............. B28B 13/04 83/651.1
5,487,526 A * 1/1996 Hupp ...................... E01C 9/001 404/93
6,007,321 A * 12/1999 Meckel ................. B28B 7/0029 425/432
7,935,284 B2 * 5/2011 Metten .................. B28B 13/028 264/77
2003/0109621 A1 * 6/2003 Miura .................. G10K 11/162 524/464
2004/0046084 A1 3/2004 Brzeski et al.
(Continued)

FOREIGN PATENT DOCUMENTS

DE 3050756 C2 2/1985
DE 102011050974 A1 12/2012
DE 102012100616 B4 8/2013
(Continued)

OTHER PUBLICATIONS

UAE Search and Examination Report Dated Apr. 25, 2024.

*Primary Examiner* — Nahida Sultana
(74) *Attorney, Agent, or Firm* — WELSH FLAXMAN & GITLER LLC

(57) ABSTRACT

A method of producing concrete blocks for creating a surface covering, wherein each concrete block comprises a multiple-layer concrete block body with at least one level concrete block underside and, opposite the at least one level concrete black underside, an essentially flat concrete block upper side, wherein the multi-layer concrete block body comprises a first concrete block layer designed as a facing concrete layer and forming the concrete block upper surface, at least one second concrete block layer designed as a core concrete layer, as well as at least one third concrete block layer forming the concrete block underside. In the method at least one formwork is provided.

15 Claims, 3 Drawing Sheets

(56) References Cited

U.S. PATENT DOCUMENTS

| | | | | | |
|---|---|---|---|---|---|
| 2005/0211871 | A1* | 9/2005 | Ness | ...................... | B28B 7/364<br>249/155 |
| 2008/0271599 | A1* | 11/2008 | Edlinger | .................. | C22B 7/02<br>96/221 |

FOREIGN PATENT DOCUMENTS

| | | | | | |
|---|---|---|---|---|---|
| DE | 102020108785 | A1 | | 9/2021 | |
| EP | 2055457 | A | | 5/2009 | |
| EP | 1685932 | B1 | * | 5/2010 | ............ B28B 7/364 |
| EP | 3889351 | A2 | | 10/2013 | |
| EP | 3153625 | A1 | | 4/2017 | |
| EP | 3710645 | B1 | * | 4/2023 | .............. E04C 1/41 |
| KR | 101833676 | B1 | * | 2/2018 | ............ E01C 5/065 |
| KR | 1020200035548 | A | | 4/2020 | |

* cited by examiner

METHOD OF AND DEVICE FOR PRODUCING CONCRETE BLOCKS

BACKGROUND OF THE INVENTION

The invention relates to a method of and a device for producing concrete blocks, more particularly concrete blocks that are suitable for creating a surface covering.

Concrete blocks, more particularly surface covering elements, paving stones, stair steps, wall and boundary stones made of concrete are sufficiently well known. Such concrete blocks are very often used in road building, traffic route construction and landscaping to create surface coverings, so concrete blocks for the creation of surface coverings are prevalent and well-known.

Especially in urban settings, large areas of the surface are designed as walkable or drivable traffic infrastructure, such as roads, paths, squares or carparks, and are covered with surface coverings. The surface coverings are often produced in that individual concrete blocks are laid in conjunction with each other on a bedding layer of the substrate, for example by paving. As a result, joints remain between adjacent concrete blocks or moulded blocks, in particular concrete paving stones, which are filled with sand-like or gravel-like joint materials.

For the creation of a surface covering of this type, it is also known to use concrete blocks or concrete paving stones built up in multiple layers. These multiple-layer concrete blocks generally comprise a core layer and a facing layer, wherein the core layer is usually made of a core concrete and forms the core of the concrete block, and wherein the facing layer is generally made of a face concrete and forms the walkable or drivable upper side of the concrete block, namely its visible surface.

Concrete blocks are usually manufactured with the aid of formwork and this is, for example, performed by a machine. It is known to produce concrete paving stones in paving stone machines or units specially intended for this purpose. As a rule, the concrete paving stones are manufactured in desired stone formats using respective corresponding formworks.

It is also known that the multiple-layer concrete blocks of the described type, due to their structure and the nature of the individual layers, particularly also because of the nature of the concrete used to produce the individual layers, are designed in such a way that they have a determined or desired water permeability and/or also a determined or desired water storage capacity.

Thus, German Patent No. DE 10 2012 100 616 B4, for instance, discloses a surface covering of two-layer moulded blocks, which under an essentially water-impermeable layer on the surface, have a water-absorbing, water-permeable layer, so that the rainwater falling on it can flow off downwards via the joints as well as the water-permeable layers of the moulded blocks, thus via a seepage path through the concrete blocks themselves.

If necessary, the rainwater can also be stored, as a result of which through increased water evaporation a so-called urban "heat island effect" can be countered, as cooling by evaporation occurs when water evaporates. A water-storing concrete block of this type is known from European Patent No. 3 153 625 A1 for example.

When manufacturing multiple-layer concrete blocks, with the methods known from the existing art, it is often difficult and problematic to obtain a desired layer structure in a defined manner in the concrete block, particularly if layers with a small layer thickness are to be produced. There, therefore, remains a need for improved manufacturing methods.

SUMMARY OF THE INVENTION

It is therefore an object of the present invention to provide a method of manufacturing multiple-layer concrete blocks that allows for the rapid and flexible production by the machine of concrete blocks with a defined layer structure and, in particular, at the same time allows the production of thin concrete block layers. Other advantageous aspects, details and embodiment of the invention are set out in the dependent claims, the description and the drawings.

The present invention provides a method of manufacturing concrete blocks, more particularly manufacturing concrete blocks for producing a surface covering. The method according to the invention is envisaged for the corresponding operation of a paving stone machine. Each concrete block, more particularly concrete paving stone, manufactured by means of the present method comprises a multiple-layer concrete block body with at least one even concrete block underside and, opposite this, an essentially flat concrete block upper side. The concrete block body comprises at least one first concrete block layer designed as a facing concrete layer and forming the upper side of the concrete block, at least one second concrete block layer designed as the core concrete layer as well as at least one third concrete block layer forming the concrete block underside. In the method, at least one formwork is initially provided. In a step for producing the second concrete block layer as the core concrete layer, a core concrete is introduced into the formwork by means of a first filling device. After introducing the core concrete, in a further step for producing the first concrete block layer designed as a facing concrete layer, a face concrete is subsequently filled into the formwork. The concrete material filled into the formwork is then compacted and hardened. A special aspect of the method according to the invention can be seen in the fact that in the initial step of the method to produce the third concrete block layer, before introducing the core concrete into the formwork, a concrete material for the third concrete layer is introduced into the formwork by means of a first dosing device.

Expressed in other words, after providing the formwork, firstly, in an initial processing step, the third concrete block layer is produced, then the second concrete block layer and thereafter the first concrete block layer.

The concrete block layers adjoin each other in a direction along a vertical axis of the concrete block body, wherein the second concrete block layer adjoins the first concrete block layer forming the upper side of the concrete block, and the third concrete block layer in turn adjoins the second concrete block layer. In this context, the term "adjoins" should be understood to the effect that the adjoining concrete block layers directly follow on from each other, i.e. without intermediate layers, and are connected to each other, or that additional intermediate layers are provided and the adjoining concrete block layers are thereby indirectly connected to each other. In each case, the second concrete block layer designed as the core concrete layer is arranged between the first and the third concrete block layer.

In this method, the face concrete for producing the first concrete block layer can be subsequently filled by means of a filling device or, if applicable, by means of a dosing device, wherein the face concrete is preferably subsequently filled by means of a second filling device. A filling device in accordance with the present invention can, for example, be a filling hopper, more particularly a moveable, controlled driven filling hopper, that is moveable, namely displaceable relative to the formwork.

With the method according to the invention, the machine-based or automated manufacturing of multiple-layer concrete blocks, which can also be understood here are layered concrete blocks, is possible in a particularly defined manner and with a precise layer structure. Very particular advantages result from the method according to the invention by the fact that the concrete block layers, in particular, the third concrete block layer forming the concrete block layer underside can be produced in a desired, precisely defined and, in particular, uniform layer thickness, irrespective of the concrete material used for production, and also in an especially small layer thickness.

This means the concrete material for the third concrete block layer can be selected in an application-specific manner and can, for example, also be a tough or coarse or low-moisture or grainy concrete material, wherein at the same time, the layer thickness of the third concrete block layer can be kept very small and the thin concrete layer can thereby be produced defined and evenly.

With the present method, a layered concrete block can be produced which is provided at least with the “third concrete block layer”, which here can also be called a “functional layer”. Depending on the type and planned use of the concrete block, the functional layer can fulfil a variety of functions and can be provided, for example, as a layer for regulating water permeability or water storage or also as a high-strength layer to increase the compressive or tensile strength of the concrete block, or as a layer for securing the concrete block against displacement or for interlocking with the substrate, for example with the bedding layer.

For example, the third concrete block layer can here be a water-storing or water-permeable or water-impermeable concrete block layer, a displacement securing or interlocking layer or a stability or strength layer, more particularly a compressive or tensile strength layer or similar.

The present concrete blocks can also be designated as concrete surface covering elements and are, in particular, designed to be slab or stone-shaped for example. With the method according to the invention, the manufacturing of the concrete block, which here can also be designed as a concrete paving stone and is preferably a “paving stone made of concrete” in accordance with DIN EN 1338, takes place machined in a device for manufacturing concrete blocks which are advantageously configured for automated, preferably controlled, more particularly program-controlled production and, for example, comprises a paving stone machine. The method of manufacturing the concrete blocks, therefore, takes place in an automated, preferably controlled, more particularly program-controlled manner.

The “formwork” used for implementing the method is preferably a mould which is configured for one single or for more than one concrete block, i.e. in one formwork one or more concrete blocks can be moulded, wherein in the latter case a plurality of mould recesses are formed in the formwork, which respectively can also be understood as an individual mould. The concrete blocks are preferably produced in a desired format or end format, which here can also be designated as nominal format or nominal size or nominal measurement.

The concrete material for the third concrete block layer is preferably introduced into the formwork in a volumetrically-dosed manner. Through this, the concrete material is dosed into the formwork in a precise volume so that the layer structure and also, in particular, the thin and uniform layer thickness of the third concrete block layer can be precisely and evenly adhered to.

Volumetric dosing takes place in a volume and thus quantity-related manner, which means that the dosing device does not determine or measure the mass of the material to be dosed, but the volume, for which reason the volumetric dosing here also depends on the “concrete material specification” for example. For a high degree of accuracy, before use, the dosing device is therefore preferably calibrated to the concrete material used to manufacture the third concrete block layer, especially when changing between different concrete materials.

Particular advantages arise if the concrete material for the third concrete block layer is introduced into the formwork by means of a dosage device designed as a cellular wheel sluice or comprising a cellular wheel sluice. Cellular wheel sluices, which are also known as devices for dosing or feeding in material, in particular grainy materials, are known to a person skilled in the art in various embodiments. Advantageously, with such cellular wheel sluices a very high dosing accuracy can be achieved so that the concrete material is dosed very precisely via the cellular wheel sluice, i.e. introduced into the formwork with high dosing precision. The concrete material is volumetrically-dosed and the exact and volume-related precisely determined amount of concrete material can be dosed and introduced into the formwork.

The cellular wheel sluice preferably used here comprises, for example, a controlled driven, rotating cellular wheel and dosing aid interacting with the cellular wheel, wherein the dosing aid is for example a dosing plate configured in the form of a perforated metal plate.

More particularly, in the present method, the dosing aid is adapted to the dosing in or volumetric introduction of the concrete material into the formwork, in dependence on the used concrete material that is to be dosed. For example, a hole size of the dosing plate is selected or set as a function of the grain size of the concrete material. Preferably the hole size of the dosing plate is selected to that it is in a range of around 2 to 2.5 times the grain size.

Depending on the design of the dosing device configured as, or comprising the cellular wheel sluice, when being introduced or filled into the formwork, the concrete material can at the same time already be evenly distributed in the formwork, more particularly distributed over the area of the formwork, which facilitates and supports an even layer formation and layer thickness.

For the volumetrically-dosed introduction of the concrete material for the third concrete block layer, a rotating cellular wheel of the cellular wheel sluice is preferably driven in a controlled manner. The rotational speed of the cellular wheel can be set in a controlled manner, more particularly frequency-controlled, for example by way of a frequency-controlled gear unit. By setting the rotational speed of the rotating cellular wheel, the dosing precision and dosing behaviour can be matched to the respective concrete material for the third concrete block layer, through which the dosing precision and dosing behaviour can be improved overall. As, among other things, the rotational speed of the cellular wheel, namely its number of revolutions, affects the quantity of conveyed or delivered and thus dosed concrete material, the rotational speed can also be set depending on the desired layer thickness to be produced.

Preferably, during the introduction of the concrete material for the third concrete block layer, the dosing device is moved in at least one first direction of travel running along a longitudinal axis of the formwork at a controlled predetermined or controlled set speed which is also known as the feed speed. In this case, the dosing device is displaceably mounted, for example displaceably mounted on a corresponding frame, or by means of a guide envisaged therefore, for example, a sliding guide, and can, preferably above the formwork, be moved over the formwork in the direction of its longitudinal axis. Through this, the concrete material is evenly supplied, in particular at least in relation to the longitudinal direction of formwork, namely its length.

The movement, or displacement, of the dosing device in the first direction of travel is driven, for example, by means of a controlled driving mechanism. The controlled driving mechanisms comprise, for example, a controlled gear unit, more particularly a frequency-controlled gear unit. In the present method, the dosing device is displaced in a controlled manner in this first direction of travel, wherein the advancing speed along the movement path of the dosing device, i.e. over the advancing section, can be adapted or kept constant in a controlled manner.

The filling device is also preferably a filling hopper displaceable in a controlled manner at least in the first direction of travel. The functioning or operating mode of the filling device and dosing device can be independent of each other or coupled.

For example, according to a first operational variant, the filling device and dosing device can be coupled in such a way that in one operational step, the concrete material for the third concrete block layer is introduced into the formwork in a volumetrically-dosed manner and the core concrete material is filled in, in that the dosing device and the filling device are jointly moved or displaced along the formwork in the first direction of travel above it. Filling the formwork takes place sequentially, as in this first direction of travel, the dosing device runs ahead of the filling device so that at each point of the formwork that is being filled, the concrete material for the third concrete block layer is always introduced in a volumetrically-dosed manner first and the core concrete then filled in. An operational step is here taken to mean a single advancing event in the first direction of travel. With this first operational variant, two concrete block layers can thus be produced in one operational step, which advantageously results in a time saving.

In this first operational variant, after the one operational step, the filling device and dosing device can, in a resetting movement orientated counter to the first direction of travel, be moved back into their initial position. The return or resetting can take place when in no-load operation, i.e. without delivering concrete material into the formwork. However, alternatively, for example, the dosing device can be returned or reset during the production run so that further concrete material for producing a further concrete block layer above the core concrete layer is dosed in during returning.

According to a second operational variant, the dosing device and the filling device are moved independently of, or separately from, each other, i.e. in two working steps, in the first direction of travel, in order to each introduce concrete into the formwork. Here, for example, in the first operational step, in the production run, the dosing device can be moved in the first direction of travel and then be reset in no-load operation. In the second operational step, in the production run the filling device can finally be moved in the first direction of travel and then reset in no-load operation. With this second operational variant, it is advantageous that between two operational steps, a compacting and/or distribution step, such as shaking, punching, pressing, stabbing or suchlike, can be carried out.

In the case of a formwork with several mould recesses, it is also achieved that the mould recesses adjoining each other in the direction of the longitudinal axis are all reached by the dosing unit and are accordingly "provided" with the concrete material in the desired manner. In accordance with particularly preferred variants, it is also conceivable that the dosing device is additionally moved over the formwork in a direction running perpendicularly to the longitudinal axis of the formwork, namely in the direction of a width of the formwork, in order to also ensure distribution of the concrete material in the direction orientated perpendicularly to the longitudinal axis, namely over the width of the formwork.

In forms of the embodiment with a cellular wheel sluice, the cellular wheel sluice has, for example, an operational width which corresponds to the width of the formwork, so that when the dosing device is moved in the direction of travel, i.e. in the direction along the longitudinal axis of the formwork, which is essentially perpendicular to the operational width, all the mould recesses be can be filled equally. The operational width of the cellular wheel sluice is hereby understood as the width, or the width section or extent area, along which the concrete material can be supplied in a dosed manner by the cellular wheel sluice, i.e. the width section over which the rotating cellular wheel, in interaction with an outlet and/or with a discharge device provided on the outlet, discharges or dispenses the concrete material.

In the present case, the rotating cellular wheel of the cellular wheel sluice is a long or elongated rotor or rotor body, extending in length along the axis of rotation, with long or elongated rotor blades, also extending in length along the axis of rotation. As the operational width is also determined by the longitudinal extent of the cellular wheel and the longitudinal extent of the outlet or the discharge device provided on the outlet interacting with the cellular wheel, the operational width in the described preferred form of the embodiment corresponds with the length of the cellular wheel, which preferably in turn corresponds with the width of the formwork used.

Preferably, in the present method, the advancing speed of the dosing device is moved in the direction of travel and the rotational speed of the cellular wheel are matched to each other in a controlled manner and, more particularly, are adapted and matched to each other as a function of the type of concrete material used for the third concrete block layer and/or a desired layer thickness of the third concrete block layer. Through this, application-related, optimised and effective feed of the concrete material into the formwork or into the individual mould recesses can be guaranteed. Therefore, in the present method, by way of a suitable combination or matching to each other of the selected, controlled set advancing speed and rotational speed, the layer thickness of the third concrete block layer can be determined.

Through the advantageous provision of a formwork with a plurality of mould recesses, a number of concrete blocks corresponding to the number of mould recesses can be simultaneously produced in one process run. Particularly advantageously the concrete material for the third concrete block layer is filled into each of the mould recesses of the formwork in a dosed manner, so that the concrete blocks of a desired type or kind can be reliably produced in layers, namely as whole layers of the same concrete blocks with corresponding identical and equally dimensioned concrete block layers.

Advantageously at least the advancing speed of the dosing device, preferably also the rotational speed of the cellular wheel, is controlled as a function of the embodiment of the formwork. This shape-dependent control can also be understood as adapting the advancing and/or the advancing speed to the formwork, wherein in this sense the terms, "recipe control" or "recipe-controlled advancing" can be used as synonyms.

For example, the advancing speed can be controlled in such a way, that a magnitude of the speed along the path of travel, i.e. along the advancing section, changes in the manner of a sinus curve or the speed values take on a sinus curve-shaped course. In particular, the respective advancing speed in the respective areas of transition between two adjacent mould recesses of the formwork is at a minimum. Through this, exceptionally even distribution of the concrete material can advantageously be achieved, as "shading" or "shading effects" caused by the intermediate walls separating the mould recesses that can have a negative effect on the even filling of the concrete material, can be effectively reduced.

Before filling the core concrete and/or before subsequently filling the facing concrete, at least one further concrete material is filled into the formwork and thereby at least one further concrete block layer is produced. This further concrete block layer can be arranged between the second and third concrete block layers or between the first and second concrete block layers. With this method variant, four-layer concrete blocks or even concrete blocks with more than four concrete block layers can advantageously be produced simply, quickly and reliably.

In those cases in which three concrete block layers, namely the first, second and third concrete block layers are produced, the second concrete block layer arranged between the first and third concrete block layers directly adjoins the first and third concrete block layers respectively. In the equally possible cases in which four or more concrete block layers are produced, the second concrete block layer does not directly adjoin at least one of the first or third concrete block layers, but indirectly via the further concrete block layer.

In the preferred variant of the method with the production of at least one further concrete block layer, the further concrete material for the further concrete block layer is preferably introduced into the formwork in a volumetrically-dosed manner, more particularly also by means of the first dosing device, or by means of a second dosing device configured as a cellular wheel sluice or comprising a cellular wheel sluice. Through this, the further concrete block layer can be produced in the same advantageous way as described above for the third concrete block layer.

In the case that further concrete material for the further concrete block layer is introduced via a second dosing device, the first and the second dosing device can operate independently of each other, i.e. can be operated independently of each other and thereby be controlled, driven and moved independently of each other. Alternatively, however, the dosing devices can also work and be operated in a coupled working or operating mode.

For example, in the present method, a plurality of further concrete block layers can be integrated into the concrete block body, wherein preferably each one of the many further concrete block layers is very thin and has a small layer thickness. As a result of this corresponding "multiple-layer layer arrangement" of the thin concrete block layer or this mutual "over-layering" of the plurality of thin concrete block layers, transition layers or graduation layers or mixed layers can be produced, for example.

Preferably, for the manufacturing of such a plurality of further concrete block layers, a first and a second dosing device with a respective cellular wheel sluice is used, wherein the two cellular wheel sluices operate alternatingly, for example, and each consecutively introduce a respective concrete material into the formwork in a volumetrically-dosed manner. Between the respective dosing steps, additional steps can be carried out for compacting or shaking or punching the concrete material introduced in a respective dosing step. As has already been stated, a coupled mode of operation is also possible, in which the dosing devices are connected in series in such a way that they dose the concrete material into the formwork in a common working step, in other words in a joint advance.

According to a particularly preferred form of embodiment, after respectively being introduced, the concrete material introduced into the formwork for the third concrete block layer and/or the introduced core concrete and/or the introduced face concrete is/are evenly spread with concrete spreading means. Spreading of the respective concrete can be carried out with spreading means provided for this. Through this spreading step, particularly uniform concrete block layers can be produced. More particularly, through this, in relation to the area, the concrete block layers have a constant layer thickness with small variations.

Preferably too, the concrete material introduced into the formwork for the third concrete block layer is pre-compacted in an intermediate step before the introduction of the core concrete. Compacting can take place, for example, by pressing or shaking, for example with a punch or a press or with a shaking system. Alternatively or additionally, before the introduction of the facing concrete, the core concrete introduced into the formwork is pre-compacted in an intermediate step. Here too, compacting can take place by way of a punch of a press or through vibration or shaking.

In a particularly preferred manner, the third concrete block layer is produced with a layer thickness which is between 1% and 20% of a total height of the concrete block body, preferably between 2% and 15% of a total height of the concrete block and particularly preferably between 4% and 12%, and especially preferably between 5% and 10% of a total height of the concrete block body.

As concrete material for producing the third concrete block layer, a gravel and/or sand-rich concrete can be used, for example. More particularly, a dry concrete can be used. The concrete material can be a coarse or fine concrete material and comprise a coarse or fine aggregate, the grain size of which can, for example, be in a range of 0 to 4 mm or 2 to 8 mm or 4 to 8 mm or 8 to 22 mm. As concrete material for producing the third concrete block layer, a high-strength concrete can also be used.

Very particularly preferably, an earth-moist concrete can be used as the concrete material for producing the third concrete block layer. "Earth-moist concrete" is taken to mean a concrete of stiff consistency with a water/cement ratio (in short: w/c value) of less than or equal to 0.4. Preferably a concrete with a water/cement ratio in a range of 0.25 to 0.4 is used, more particularly with a water/cement ratio in a range of 0.28 to 0.38.

As the core concrete for producing the second concrete block layer, a porous concrete is preferably used. Through this, a concrete block with a desired water permeability or also with water-storing properties can be produced. Such concrete blocks can, for example, benefit the inner-city climate through increased water evaporation during exposure to sunlight and can thus counter a so-called heat island effect. Such water-permeable concrete blocks in an ecologically effective way contribute to ensuring that surface coverings made thereof do not lead to complete surface sealing.

The present invention also relates to a device for manufacturing concrete blocks. The device comprises at least one formwork with at least one or more mould recesses and at least one first filling device for introducing concrete into the formwork. The device is characterised in particular by a first dosing device, wherein the first dosing device is configured for the volumetrically dose filling of concrete material into the formwork.

With regard to the design of the present device, reference is made to the above description, where in conjunction with the method, the device is already described in more detail.

Preferably, the device also comprises a second filling device. Each of the filling devices can, for example, be in the form of a filling hopper. A second dosing device can preferably also be provided.

Particular advantages result from the fact that the first dosing device and preferably also the second dosing device can be coupled to the first filling device and can be coupled in such a way that the filling device and the dosing device(s) can be operated in a coupled working mode and in one working step the volumetrically-dosed introduction of concrete material by the dosing device(s) as well as the filling of the core concrete can be carried out. Alternatively or additionally, however, the filling devices and the dosing devices can also be designed to operate independently of each other.

Preferably the at least one first dosing device is formed by a cellular wheel sluice or comprises at least one cellular wheel sluice. Also preferably, the at least one first dosing device is moveably borne and can be moved in a driven manner, more particularly controlled driven manner, in at least one first direction of travel in a direction running along a longitudinal axis of the formwork.

At least the first filling device is preferably designed in the form of a filling hopper that can be moved in a driven manner in a direction along a longitudinal axis of the formwork. Optionally, the second filling device can also be designed in the form of a filling hopper that can be moved in a driven manner in a direction along a longitudinal axis of the formwork.

In the device, a control and/or regulating unit communicating with the first and, where applicable, the second filling device as well as with the first and, where applicable, the second dosing device is provided. The introduction of concrete material into the formwork can be adjusted in a controlled manner, more particularly programme-controlled manner by way of at least one control routine executed in the control and/or regulating unit.

Further embodiments, advantages and application possibilities of the present invention are set out in the following description of examples of embodiment and in the figures. Here, all described and/or visually shown features are by themselves or in any combination fundamentally the subject matter of the invention, irrespective of their combination in the claims or their dependency. The content of the claims is also made part of the description.

BRIEF DESCRIPTION OF THE DRAWINGS

The invention will be described below with the aid of examples of embodiment in connection with the drawings. In these.

DETAILED DESCRIPTION OF THE INVENTION

Figure 1:
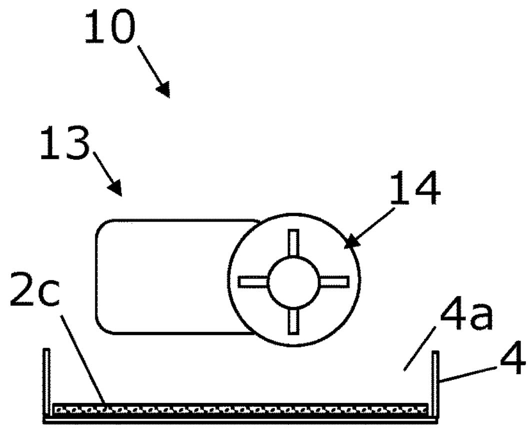
FIG. 1 shows a roughly schematic and greatly simplified view of a section of a form of embodiment of a device for manufacturing a concrete block in a state during the introduction of concrete material into a formwork.

For the same elements of the invention or those acting in the same way, identical reference numbers are used in the figures. Furthermore, for the sake of clarity, in the individual figures, only reference numbers are used that are required for the description of the respective figure.

The present method of manufacturing multiple-layer concrete blocks 1 (not clearly seen in FIGS. 1 to 4; for this see FIGS. 7 to 9) is described by way of example with reference to FIGS. 1 to 4. Purely as an example, FIGS. 1 to 4 set out individual, selected procedural steps and show, in each case greatly simplified and only roughly schematic, views or partial views, of respective sections of a device 10 for manufacturing the concrete blocks 1 as it can be used for implementing the method. Shown in the figures are individual units or fittings comprised by the device that have been selected for the respective figure.

With the present method, the concrete blocks 1 are produced as multiple-layer concrete blocks 1, each with a multiple-layer concrete block body 2, which comprises a first concrete block layer 2*a* made of a facing concrete and designed as a facing layer, a second concrete block layer 2*b* made of a core concrete and designed as a core concrete layer and at least one third concrete block layer 2*c*. The first concrete block layer 2*a* designed as a facing concrete layer forms a concrete block layer upper side 2.1 of the concrete block body 2 and thus also the surface of the concrete block 1, namely in the used condition, in which several concrete blocks 1 laid in conjunction with each other form a surface covering, the visible and walkable or drivable surface or traffic surface. The third concrete block layer 2*c* forms a concrete block underside which is opposite the concrete block layer upper side 2.1 and is envisaged for placing on a bedding layer.

In the present method, to manufacture the concrete blocks 1, a formwork 4 is initially provided, which in the examples in FIGS. 1 to 4, solely for reasons of simplified illustration, is shown as a single mould for one ground cover element, i.e. as a formwork 4 with just one mould recess 4*a* to take up the concrete material. However, it goes without saying that the formwork 4 can of course also be a formwork 4 for the simultaneous production, particularly in layers, of several concrete blocks 1, which then accordingly has several mould recesses 4*a* and each mould recess 4*a* is designed to mould one concrete block 1 each.

In the present method, in an initial procedural step outlined in FIG. 1, which is essentially the first step in producing the concrete block layers 2*a*, 2*b*, 2*c* of the multiple-layer concrete block body 2, a concrete material for the third concrete block layer 2*c* is introduced into the formwork 4 and thereby the third concrete block layer 2*c* is produced. The concrete material for the third concrete block layer 2*c* is thus introduced before the introduction of the core concrete and the facing concrete.

In the method, the concrete material for the third concrete block layer 2*c* is introduced by means of a first dosing device 13 into the formwork 4 in a volumetrically-dosed manner. In the shown example, the first dosing device 13 comprises a cellular wheel sluice 14 for the volume-related dosing of the concrete material. The dosing device 13 with the cellular wheel sluice 14 is, in relation to the formwork 4, arranged above the latter and is preferably borne in a moveable manner relative to the formwork 4.

This step of introducing the concrete material for the third concrete block layer 2*c* into the formwork 4, namely the feed of the concrete material to the mould recess 4*a* or the dosing in or additional dosing is described in more detail further below in the text relating to FIGS. 5 and 6.

In the example of FIG. 1, the concrete material for the third concrete block layer 2*c* is introduced into the mould recess 4*a* in a quantity such that a continuous, complete and even third concrete block layer 2*c* is formed. The concrete material for the third concrete block layer 2*c* in the shown example, is a coarse gravel and/or sand-rich concrete, which at least in parts is permeable to water.

For example, the concrete material for the third concrete block layer 2*c* is selected in such a way that the third concrete block layer 2*c* is configured to draw water up from the bedding layer in a capillary manner in order to increase the evaporation of water via the surface of the concrete block 1.

Figure 2:
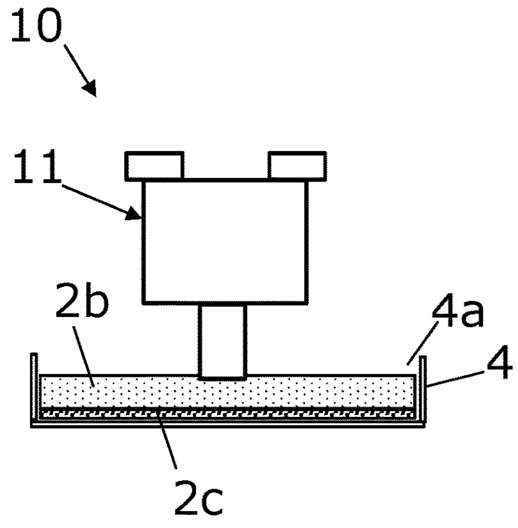
FIG. 2 shows a roughly schematic and greatly simplified view of a section of a form of embodiment of the device for manufacturing the concrete block in a state during the introduction of core concrete into a formwork.

After the step of forming the third concrete block layer 2*c*, according to this method, as shown in FIG. 2, for example, the core concrete is introduced into the formwork 4 in order to produce the second concrete block layer 2*b*. Here, the core concrete is subsequently filled onto the concrete material or the previously formed third concrete block layer 2*c* and the concrete block layer is formed.

The step of filling the core concrete into the formwork 4, which can also be understood as pouring in or casting the core concrete, takes place by way of a first filling device 11, via which the core concrete is taken from a corresponding storage container and supplied to the formwork 4, for example using suitable pumps or by other suitable conveying means known to a person skilled in the art. In the shown example, the first filling device 11 is designed as a filling hopper, which can be moved relative to the formwork 4 and, indeed, is height adjustable and further displaceable, namely displaceable both in an x-direction and y-direction in relation to a plane taking up the formwork 4, so that even filling of the formwork 4 can be facilitated or ensured.

The first filling device 11 can preferably comprise a filling tube that extends into the formwork 4 so that the core concrete can be filled with as little splashing and as cleanly as possible. The filling device 11 can, for example, comprise a funnel-shaped filling container which bears the filling tube. The filling container and/or the filling tube can, for example, be connected via a flexible connection piece, for example, via a hose, to other units of the filling device 11 and/or, in particular, connected to a concrete reserve.

Figure 3:
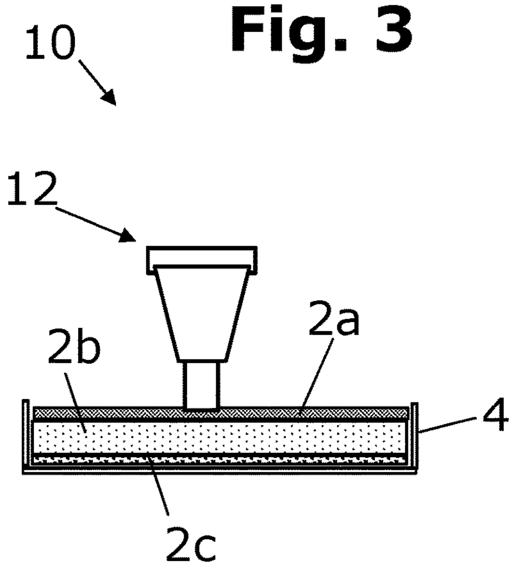
FIG. 3 shows a roughly schematic and greatly simplified view of a section of a form of embodiment of the device for manufacturing the concrete block in a state during the introduction of face concrete into a formwork.

In a next step of the method, which is outlined in the greatly simplified illustration of FIG. 3, a facing concrete is subsequently filled onto the prepared second concrete block layer 2*b* and through this a first concrete block layer 2*a* forming the facing concrete layer is produced. Introduction of the facing concrete into the formwork 4 takes place by means of a second filling device 12, which can be designed similarly to the first filling device 11 and is preferably also displaceable and therefore movable relative to the formwork 4.

Figure 4:
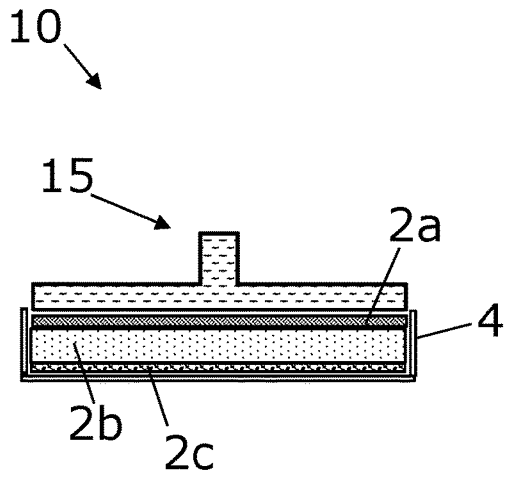
FIG. 4 shows a roughly schematic and greatly simplified view of a section of a form of embodiment of the device for manufacturing the concrete block in a state during the compacting of the concrete.

In a further next step of the manufacturing process, the concrete filled into the formwork 4 is compacted, as shown in a roughly schematic manner in FIG. 4. For this, a compacting device is used, for example, which more particularly comprises a press or a punch 15. Alternatively or additionally, compacting of the concrete can also take place by shaking and/or vibration. After compacting, the concrete is finally hardened, through which the concrete block body 2 is completed.

Figure 5:
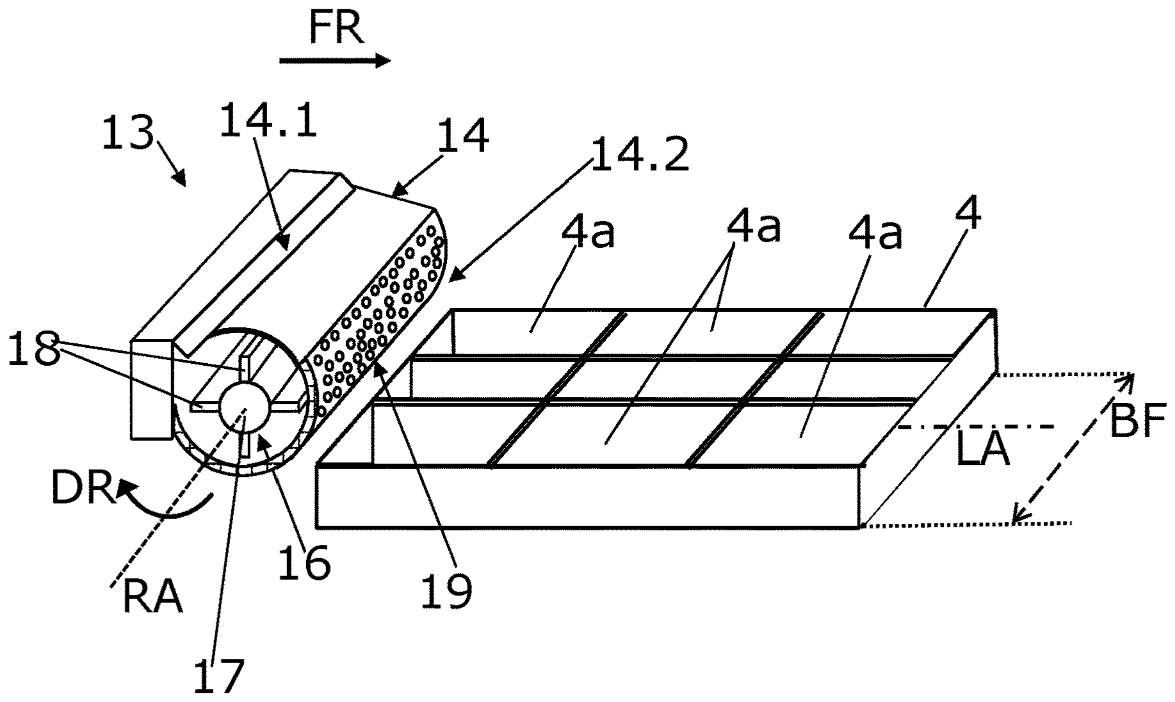
FIG. 5 shows a very simplified and roughly schematically outlined perspective view of a form of embodiment of a dosing device and a formwork to be filled.
Figure 6:
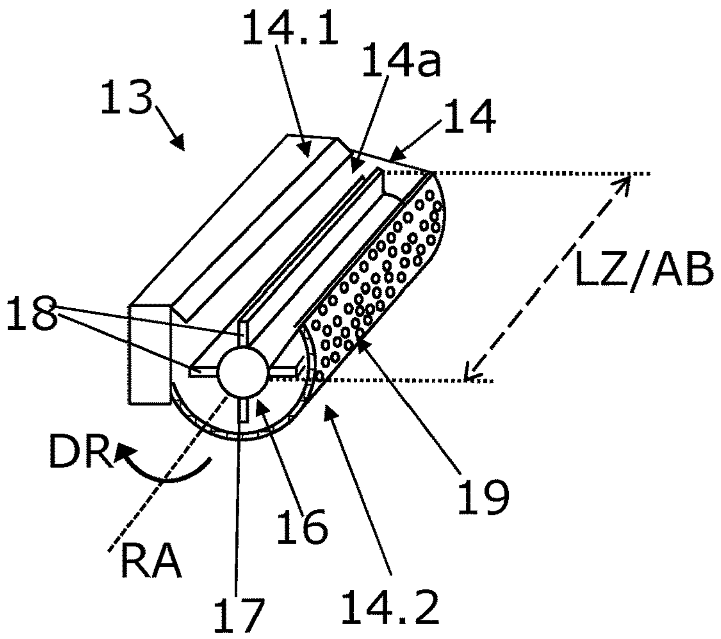
FIG. 6 shows the dosing device in FIG. 5 with a partially opened housing.

With reference to FIGS. 5 and 6, the volumetrically-dosed introduction of the concrete material for the third concrete block layer 2*c* by way of the first dosing device 13 is described in more detail. As has already been mentioned above in connection with FIG. 1, the dosing device 13 in the shown example, is a cellular wheel sluice 14, which in the figures is only shown partially and very roughly schematically.

The example cellular wheel sluice 14 is designed and fitted out in such a way that the introduction of concrete material into a formwork 4 provided with several mould recesses 4*a* can take place in an optimal and effective manner and the concrete material is volumetrically-dosed into each of the mould recesses 4*a*.

In the example shown in FIG. 5, the formwork 4, which in terms of its length extends along a longitudinal axis LA and in the direction perpendicular to the longitudinal axis A has a mould width BF, has nine mould recesses 4*a*, wherein it is expressly emphasised that the shown number and arrangement of the mould recesses 4*a* is only given as an example and, of course, different numbers and arrangements are conceivable without departing from the inventive idea.

The cellular wheel sluice 14, which, for the sake of clarity, is shown again in FIG. 6 isolated from the formwork 4 and in a partially covered state, has an operational width AB, which corresponds or approximately corresponds to the mould width BF of the formwork 4 so that the concrete material is given off or discharged over the entire mould width BF of the formwork 4.

On the inlet side, in an area of the inlet 14.1, the cellular wheel sluice 14 is supplied with concrete material via a supply or delivery unit which is not shown in the figures. The cellular wheel sluice 14 also comprises an intermediate storage unit, not shown in the figures, which is provided in the area of an inlet 14.1 and is connected therewith in such a way that concrete material held in the intermediate storage unit can be supplied to a sluice or dosage space 14*a* of the cellular wheel sluice 14. The concrete material thus reaches the sluice or dosage space 14*a*, which can also be designated as the sluice or dosage chamber, and is at least in sections delimited by a casing wall or chamber wall.

Arranged in the sluice or dosing space 14*a* is the driven cellular wheel 16 which is provided with a (not shown) drive and rotates about an axis of rotation RA in direction of rotation DR. The cellular wheel 16 comprises a long or elongated axial body or rotor body 17, extending in terms of its length along the axis of rotation RA and arranged on which is a plurality of rotor blades 18 which are also long or elongated and again in terms of their respective length, extend in the direction of the axis of rotation RA. The cellular wheel 16 has a cellular wheel length LZ approximately corresponding to the operational width AB.

The rotor blades 18, which in the shown example are four in number, but this can also be departed from, essentially project radially outwards from the rotor body 17. The cellular wheel 16, in particular an outer circumference of the cellular wheel 16, is dimensioned in such a way that the cellular wheel 16 fits, more particularly precisely fits into the housing of the sluice or dosing space 14*a* and can rotate freely. Here, the rotor blades 18 are arranged with their respective outwardly directed free longitudinal sides as close as possible to the housing walls, but at the same time at a sufficient distance that clogging or blocking or caking with concrete material is prevented.

The rotor blades 18 are evenly distributed around the circumference of the rotor body 17, wherein between respective adjacent rotor blades 18 a cell is formed in each case. Between respective adjacent rotor blades 18 the same angular distance is always maintained so that all the cells of the cellular wheel 16 are essentially the same size. During rotation of the cellular wheel 16 about the axis of rotation RA, each cell takes up a defined quantity of concrete material in the area of the inlet 14.1 of the cellular wheel sluice 14 and discharges it in the area of an outlet 14.2, from where the concrete material falls or is introduced into the formwork 4 arranged underneath it.

In the example cellular wheel sluice 14, in the area of the outlet 14.2, a dosing aid 19 is provided, which can also be designated as a distribution and/or output aid, and in the shown example is designed as a dosing plate, which in turn can be designated as a distributing plate. The dosing plate 19 of the shown example is an arched metal sheet provided with a plurality of apertures, for example an arched perforated plate or an arched, perforated metal sheet. The dosing plate 19 of the shown example is essentially a bowl-shaped or partially cylindrical perforated metal sheet. When the concrete material is discharged at the outlet 14.2, the concrete material passes from the respective cells of the cellular wheel 16, through the holes in the perforated metal plate and into the formwork 4. By means of the dosing plate 19 the concrete material is evenly distributed in relation to the area of the formwork 4.

The exemplary dosing device 13 with cellular wheel sluice 14 is borne movable, for example in a displaceable manner on a frame, not shown in the figures, and has a drive, also not shown in the figures, so that the dosing device 13 with cellular wheel sluice 14 can be moved, more particularly displaced, in a driven manner in a direction of travel FR along the longitudinal axis LA of the formwork 4. The direction of travel FR is essentially perpendicular to the operating width AB of the cellular wheel sluice 14.

To fill the concrete material into the formwork 4, the cellular wheel sluice 14 is moved from an initial position (as indicated in FIG. 5) relative to the formwork 4 and above it in direction of travel FR, wherein the cellular wheel 16 is rotated at the same time. When the cellular wheel 16 is in operation, the cellular wheel sluice 14 travels over the formwork 4. Through this, all mould recesses 4*a* can be evenly filled. It goes without saying that the dosing device 13 with cellular wheel sluice 14 can be moved back into its initial position by means of a restoring movement opposite to the direction of travel FR.

Figure 7:
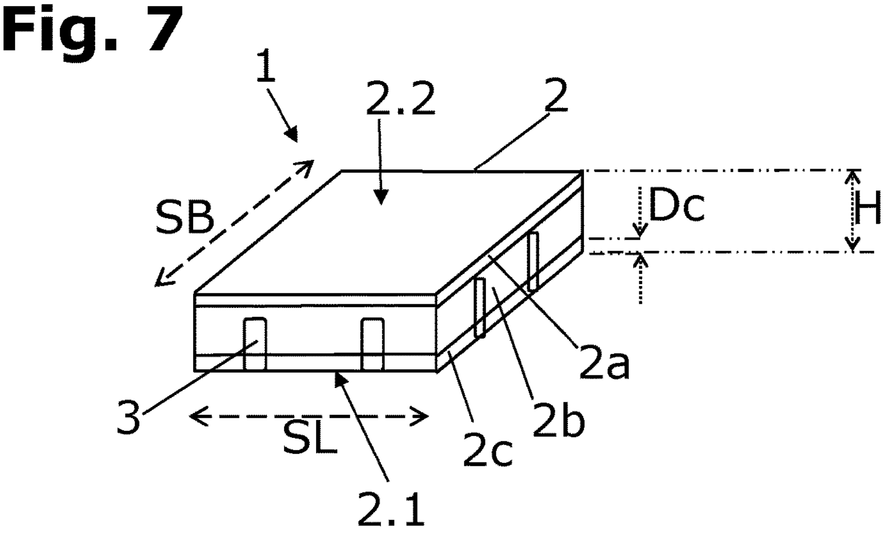
FIG. 7 shows a very simplified and roughly schematically illustrated perspective view of a form of embodiment of a three-layer concrete block.
Figure 8:
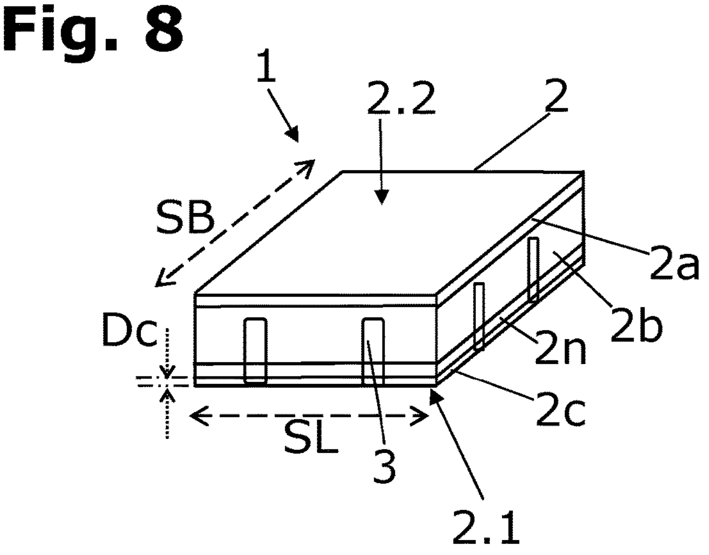
FIG. 8 shows a very simplified and roughly schematically illustrated perspective view of a form of embodiment of a four-layer concrete block.
Figure 9:
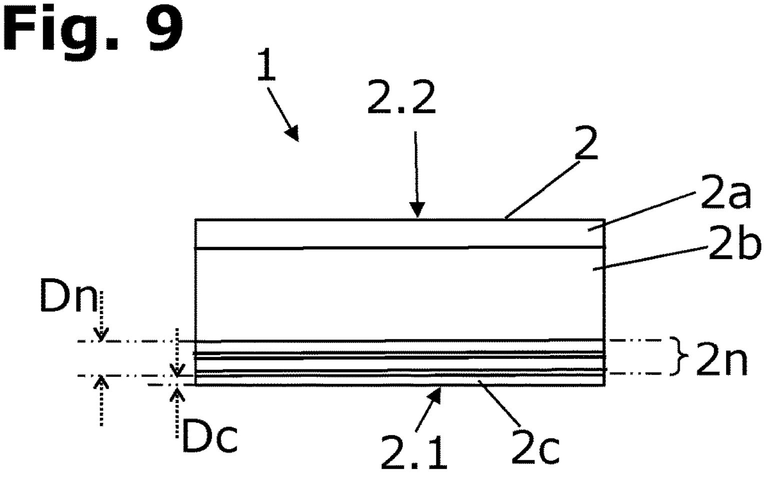
FIG. 9 shows a very simplified and roughly schematically illustrated side view of a form of embodiment of a multiple-layer concrete block.

With reference to FIGS. 7 to 9, various embodiments of example concrete blocks 1 produced by means of the present method are described. FIGS. 7 and 8 each show a greatly simplified and rough schematic perspective view and FIG. 9 shows a side view of a respective concrete block 1.

As has already been stated above in connection with the manufacturing method, the concrete blocks 1 are of multiple-layer, namely at least three-layer design, and each has a multiple-layer, in the example in the figures essentially cuboid, concrete block body 2 with at least one first, second and third concrete block layer 2*a*, 2*b*, 2*c*. FIG. 7 shows such a three-layer concrete block 1. FIG. 8 shows an alternative, four-layer variant, the concrete block body 2 of which, in addition to the first to third concrete block layer 2*a*, 2*b*, 2*c*, comprises a further concrete block layer 2*n* and FIG. 9 shows a many-layer variant.

Each concrete block 1 or the concrete block body 2 has a predetermined format with a block length SL and block width SB and comprises at least one concrete block underside 2.1 suitable for laying on a bedding layer of a substrate, and opposite site, a concrete block upper side 2.2 along which an upper surface of the concrete block 1 extends.

On the lateral surfaces of the concrete block 1, projections 3, for example rib or nose-like projections 3, can be provided which act as spacers or spacing noses and when laying the concrete blocks 1 in conjunction with each other ensure that, in the laid surface assembly, a minimum distance between the respective adjacent concrete blocks 1 is maintained and thereby joints with a predetermined minimum width are produced.

The first concrete block layer 2*a* defining the upper side and designed as a facing layer, is made of a face concrete, which is, for example, a structurally dense concrete. Depending on the purpose of use, the first concrete block layer 2*a* can be designed as an at least partially water-permeable or water-permeable but also as a water-impermeable layer.

Adjoining the first concrete block layer 2*a* is the second concrete block layer 2*b*, which in the shown examples directly adjoins the first concrete block layer 2*a*. The second concrete block layer 2*b* is made of a no-fines core concrete with a large proportion of fine and micro-pores. This no-fines concrete block layer 2*b* supports the uptake and storage of water and thus enables water to penetrate in via the lateral surface of the concrete block layer into the second concrete block layer 2*b*. Under thermal conditions that promote evaporation of water, the temporarily stored water in the second concrete block layer 2*b* can again be given off to outside, namely in the form of water vapour again via the lateral surfaces and/or in the case of a water-permeable design of the first concrete block layer 2*a* can escape or be given off via this to the atmosphere from the concrete block 1.

In FIG. 7, the third concrete block layer 2*c* directly adjoining the second concrete block layer 2*b*, is water-permeable and made of a gravel and/or sand-rich concrete material which exhibits at least moderate water permeability. The gravel and/or sand portion can be fine or coarse, or a mixture of fine-grain sand and coarse-grain gravel can be added. Also, due to the capillary effect produced in the third concrete block layer 2*c*, a supply of moisture from the bedding layer or the substrate into the second concrete block layer 2*b* is possible, through which the evaporation properties of the concrete block 1 are improved further, and, in particular, the evaporation rate is increased.

In the example shown in FIG. 8, formed between the second and the third concrete block layer 2*b*, 2*c* is an additional further concrete block layer 2*n*, through which the concrete block 1 can be even better adapted to desired purposes of use. For example, the third concrete block layer 2*c* is produced here as a stabilisation layer or strengthening layer which gives the concrete block 1 greater stability and strength. The further concrete block layer 2*n* is designed as a water-permeable layer in order, for example, to support controlled water permeability and/or storage.

In the manufacturing of the concrete block 1 shown in FIG. 8, both the concrete material for the third concrete block layer 2*c* as well as the further concrete material for the further concrete block layer 2*n* is introduced into the formwork 4 in a volumetrically-dosed manner, wherein to introduce the further concrete material for the further concrete block layer 2*n* a second dosing device is provided. Both in terms of design and function, the second dosing device is similar to the first dosing device 13 or is identical thereto.

FIG. 9 shows a side view of a further, alternative form of embodiment of the concrete block 1. Here, between the third concrete block layer 2*c* and the second concrete block layer 2*b*, the concrete block body 2 comprises a plurality of further concrete block layers 2*n* with a total layer thickness Dn. The plurality of further concrete block layers 2*n* is made up of many individual further concrete block layers 2*n* which are each very thin in design and have very small layer thicknesses. Through this, in a particularly precise and defined way, layers of different concrete material, for example, can be combined in such a way that in the concrete block body 2, a specially desired property thereof, can be set in a predetermined, defined manner, such as the desired water permeability, particular density or strength values or suchlike.

For example, it is also possible to vary and, for instance, gradually change said properties in relation to a height of the concrete block body 2 over a period of time. In doing so, one of said properties, such as the water permeability, water storage, strength or density, for example, can define a “transition” so that the plurality of further concrete block layers 2*n* can also be understood as a common transition layer. Alternatively, it would also be conceivable to successively alternate the individual thin, further concrete block layers 2*n*, so that alternating water-permeable and water-impermeable concrete block layers and/or dense and less dense concrete block layers and/or coarse and fine concrete block layers are layered on top of each other.

Preferably, for the manufacturing of a variant of an embodiment of the concrete block 1 shown as an example in FIG. 9, a first dosing device 13 and a second dosing device, in particular, each with a cellular wheel sluice 14 is used, wherein the two cellular wheel sluices 14 operate alternatingly, and each consecutively introduces a respective concrete material into the formwork 4 in a volumetrically-dosed manner. Between the respective dosing steps by the two cellular wheel sluices 14, steps can also be carried out, for example, for compacting or punching the concrete material introduced in a respective dosing step.

LIST OF REFERENCE NUMBERS

1 Concrete block
2 Concrete block body
2.1 Concrete block underside
2.2 Concrete block upper side
2*a* First concrete block layer
2*b* Second concrete block layer
2*c* Third concrete block layer
2*n* Further concrete block layer
3 Projection
4 Formwork
4*a* Mould recess
10 Device for producing concrete blocks
11 First filling device
12 Second filling device
13 First dosing device
14 Cellular wheel sluice
14.1 Inlet
14.2 Outlet
14*a* Sluice and/or dosing space
15 Press or punch
16 Cellular wheel
17 Axle or rotor body
18 Rotor blades
19 Dosing aid
AB Working width
BF Mould width
DR Direction of rotation
Dc Layer thickness of the third concrete block layer
Dn Total layer thickness of the further concrete block layers
FR Direction of travel
LA Longitudinal axis of the formwork
LZ Cellular wheel length
RA Axis of rotation
SB Width of the concrete block
SL Length of the concrete block

What is claimed is:

1. A method of producing concrete paving stones using a paving stone machine, the method comprises the steps of:

producing a second concrete paving stone layer as a core concrete paving stone layer, wherein a core concrete material is introduced into the formwork by a first filling device;

wherein after introducing the core concrete, producing a first concrete paving stone layer as the facing concrete layer, whereby a face concrete is subsequently filled into a formwork and wherein a concrete material introduced into the formwork is then compacted and hardened;

wherein before introducing the core concrete, in an initial step of the method to produce the third concrete paving stone layer, a concrete material for the third concrete paving stone layer is introduced into the formwork by a first dosing device, wherein the concrete material for the third concrete paving stone layer is introduced into the formwork by a dosing device comprising a cellular wheel sluice, and wherein each concrete paving stone comprises a multiple-layer concrete paving stone body with at least one even concrete paving stone underside and, opposite the latter, an essentially flat concrete paving stone upper side, wherein the concrete paving stone body comprises the first concrete paving stone layer as a facing concrete layer and forming the concrete paving stone upper side, at least one second concrete paving stone layer designed as a core concrete layer, as well as at least one third concrete paving stone layer forms the concrete paving stone underside, wherein in the method at least one formwork is provided; and wherein the concrete material for the third concrete paving stone layer is introduced into the formwork in a volumetrically-dosed manner using a rotating cellular wheel of the cellular wheel sluice that is driven in a controlled manner and a rotation speed of the cellular wheel is set in a controlled manner.

2. The method according to claim 1, wherein for the volumetrically-dosed introduction of the concrete material for the third concrete paving stone layer, the dosing device is moved in at least one direction of travel running in a direction along a longitudinal axis of the formwork with a controlled set advancing speed and, through this, the concrete material is evenly supplied, at least in relation to a longitudinal direction of the formwork.

3. The method according to claim 2, wherein the controlled set advancing speed of the dosing device is moved in the direction of travel and the rotation speed of the cellular wheel are matched to each other in a controlled manner and, are adapted and matched to each other as a function of the type of concrete material used for the third concrete paving stone layer and/or a desired layer thickness of the third concrete paving stone layer.

4. The method according to claim 2, wherein the controlled set advancing speed of the dosing device is moved in the direction of travel and is controlled as a function of the design of the formwork shape.

5. The method according to claim 1, wherein the formwork with a plurality of mould recesses is provided and a plurality of concrete paving stones corresponding to a number of mould recesses are produced at the same time, wherein the concrete material for the third concrete paving stone layer is introduced into each of the mould recesses of the plurality of mould recesses of the formwork in a volumetrically-dosed manner.

6. The method according to claim 1, wherein before filling the core concrete and/or before subsequently filling the face concrete, at least one further concrete material is filled into the formwork and thereby at least one further concrete paving stone layer is produced, wherein the further concrete paving stone layer is arranged between the second and third concrete block layer or between the first and second concrete paving stone layer.

7. The method according to claim 6, wherein the at least one further concrete material for the further concrete paving stone layer is introduced into the formwork in a volumetrically-dosed manner, by the first dosing device, or by a second dosing device comprising the cellular wheel sluice.

8. The method according to claim 1, wherein the concrete material introduced into the formwork for the third concrete paving stone layer and/or the introduced core concrete and/or the introduced face concrete is/are evenly spread with concrete spreading means.

9. The method according to claim 1, wherein in an intermediate step, the concrete material introduced into the formwork for the third concrete paving stone layer is pre-compacted before the introduction of the core concrete and/or in that in an intermediate step the core concrete introduced into the formwork is pre-compacted before the introduction of the facing concrete.

10. The method according to claim 1, wherein the third concrete paving stone layer is produced with a layer thickness which is between 2% and 20% of a total height of the concrete paving stone body.

11. The method according to claim 1, wherein gravel and/or sand-rich concrete is used as core concrete material for producing the third concrete paving stone layer and/or a porous concrete is used as core concrete for producing the second concrete paving stone layer.

12. The method according to claim 1, wherein a concrete with a water/cement ratio in a range of 0.25 to 0.4 is used as concrete material for producing the third concrete paving stone layer.

13. The method according to claim 1, wherein the first dosing device is movably mounted and can be moved in a driven manner, in at least one first direction of travel in a direction running along a longitudinal axis of the formwork.

14. The method according to claim 1, wherein the at least one first filling device is in the form of a filling hopper that can be moved in a direction along a longitudinal axis of the formwork.

15. The method according to claim 1, wherein the control and/or a regulating unit communicating with the at least one first filling device and the first dosing device is provided, and the introduction of concrete material into the formwork can be adjusted in a programme-controlled manner by way of at least one control routine executed in a control and/or a regulating unit.

* * * * *